Patented May 5, 1931

1,803,532

UNITED STATES PATENT OFFICE

HANS KRZIKALLA, OF MANNHEIM, AND KARL SCHNITZSPAHN, OF OFFENBACH-ON-THE-MAIN, GERMANY, ASSIGNORS, BY MESNE ASSIGNMENTS, TO GENERAL ANILINE WORKS, INC., OF NEW YORK, N. Y., A CORPORATION OF DELAWARE

PREPARATION SUITABLE FOR DEVELOPING DYEINGS

No Drawing. Application filed August 12, 1925, Serial No. 49,818, and in Germany August 15, 1924.

If aromatic amines in the form of their diazonium salts were to act on naphthols or other compounds capable of being coupled or on textile materials impregnated or dyed with such substances it was hitherto necessary to prepare each time the diazo bath from the amines with mineral acid, sodium nitrite and water, as there were no stable mixtures for the direct production of diazo solutions when dissolved in water.

We have found that dry stable preparations for making developing baths can be obtained by mixing an aromatic amine capable of being diazotized in a dry solid form which expression is meant to comprise solid aromatic amines and solid neutral and acid salts of aromatic amines, with a dry nitrite. The salts of the amines may be formed with mineral or other acids and N-sulfonic acids of the amines or their salts may also be employed. If desired, the mixture may contain in addition a compound of an acid character, such for example as an alkali metal bisulfate, naphthalene-tri-sulfonic acid, solid mineral or organic acids and the like. Such additions may also advantageously be made if an acid salt of an aromatic amine is used. The mixture may also consist of or be made from an amine capable of being diazotized and a dry solid acid substance and a nitrite; in such a case the amine will be transformed to a salt when the preparation is dissolved in water. The mixture need not be totally free from water.

It is often to be preferred to add to the mixture a dry and indifferent diluting agent as sodium sulfate, common salt, more or less dehydrated aluminium sulfate or alum, or magnesium chlorid, salts of aryl-sulfonic acids and the like.

The mixtures composed as above stated in most cases when dissolved in water give a diazo solution capable of being used for developing purposes without any further treatment. If the aromatic amine is present as such or as a neutral salt and there is no addition of an acid compound, or only so much thereof as is sufficient for forming a neutral salt, the mixture must be dissolved in a dilute acid instead of water.

An addition of some mineral or other acid to the water used for dissolving the preparation should also be made when the salt of the amine is readily hydrolyzed as in this case the formation of the diazo compound goes on more rapidly.

For applying the said mixtures with the best advantages it is important that they are readily wetted when introducing same into water or dilute mineral acid and that they do not get rid of this property in storing especially at elevated temperatures. For this reason an addition of an agent furthering the wetting, such as Turkey red oil, condensation products of formaldehyde with phenol- or naphthalene-sulfonic acids, salts of alkyl-naphthalene-sulfonic acids and the like are very useful. Further compounds used in dyeing, for example copper of chromium salts or other auxiliaries in dyeing may be added.

The nature of this invention will be more fully explained by the following examples to which however the invention is not limited. The parts are by weight.

*Example 1*

19.2 parts of aniline-hydro-sulfate, 12 parts of sodium bisulfate, 60 parts of Glauber's salt, all free from water, are well mixed, whereupon a mixture of 60 parts of sodium sulfate with 7 parts of sodium nitrite is added by portions.

The preparation obtained forms at once a diazo solution ready for use when dissolved in cold water. The mixture is very stable if protected from moisture. Instead of Glauber's salt other indifferent salts such as common salt may be employed. The quantity of sodium bisulfate may be varied, or this salt may be left out or substituted by other acid substances totally or partially. Instead of the aniline-hydro-sulfate, the hydrochloride may also be employed; in this case the quantity of sodium bisulfate should be increased.

In a similar manner developing preparations at once ready for use can be obtained from other aromatic amines, as paratoluidin or meta-xylidin.

*Example 2*

In a similar manner as described in Example 1, 22.5 parts of ortho-chloro-aniline-hydro-sulfate are mixed with 90 parts of dehydrated sodium sulfate, 20 parts of sodium bisulfate and 7.5 parts of sodium nitrite. When the mixture is dissolved in water, a diazo solution ready for use is produced in a short time. In an analogous way developing salt mixtures can be prepared from meta- or para-chloro-aniline or the homologues, anisidin and so on.

If necessary, any desired additions, such as alkali, acetate or the like may be made to the diazo solution shortly after dissolving the mixture.

*Example 3*

180 parts of alpha-naphthyl-amine hydrochloride with an addition of 2 parts of Turkey red oil (for assisting the wetting) are mixed with 465 parts of the dry technical naphthalene-1.6-disulfonic acid sodium salt and then with 70 parts of dry sodium nitrite. The mixture thus obtained is very stable even when stored at 60 degrees to 65 degrees centigrade. Instead of the alpha-naphthyl-amine-hydrochloride, a corresponding quantity of the nitrate can be employed as well.

*Example 4*

178 parts of 4-chloro-2-amino-1-toluene-hydrochloride are mixed first with 452 parts of a mixture of the sodium salts of naphthalene-tri- and -tetra-sulfonic acid (obtained by sulfonating 1 molecule of naphthalene with 4 molecules of sulfur trioxid) and then with 70 parts of dry sodium nitrite.

*Example 5*

285 parts of tolidin-hydrochloride are milled with 200 parts of partly desiccated aluminium sulfate (molecular weight 500 instead of 667) and with 435 parts of the sodium salt of 2.7-naphthalene-disulfonic acid. Then 140 parts of dry sodium nitrite are added.

*Example 6*

175 parts of para-nitraniline-hydrochloride are mixed with 355 parts of technical 1.6-naphthalene-disulfonic acid sodium salt, and 70 parts of dry sodium nitrite.

*Example 7*

69 parts of para-nitraniline are stirred into 79 parts of sulfuric acid (94 per cent strength). After the sulfate is formed 50 parts of partly dehydrated aluminium sulfate are worked into the mass. The mixture soon becomes dry and is then mixed with 100 parts of dry naphthalene-tri- and -tetra-sulfonic acid sodium salt, as obtained by sulfonating 1 molecular proportion of naphthalene with 4 molecular proportions of sulfur trioxid. Finally, 36 parts of sodium nitrite are added and the whole mass is ground until uniform.

Instead of para-nitraniline, other aromatic nitro-amino-compounds can be used.

*Example 8*

82 parts of dry ortho-chloro-aniline-hydrochloride are milled first with 183 parts of partly dehydrated aluminium sulfate and then with 35 parts of dry sodium nitrite. A product rather nonhygroscopic and very stable also when stored in a warm room, is obtained which when dissolved in dilute hydrochloric acid forms a diazo solution ready for use.

*Example 9*

18.3 parts of mono-aniline-oxalate, 80 parts of sodium sulfate, 4.5 parts of oxalic acid and 7 parts of sodium nitrite, all as dry as possible, are mixed. When dissolved in water, a diazo solution ready for use is obtained in a short time.

Instead of oxalic acid, other acid agents suitable to set nitrous acid free from its salts may be used. Sodium nitrite may be replaced by other nitrites, for example those of zinc or barium.

*Example 10*

About 42 parts of an acid salt of 1.5-naphthalene-disulfonic acid and para-nitraniline are mixed with 62.6 parts of 2.7-naphthalene-disulfonic acid sodium salt and 7.2 parts of sodium nitrite. When dissolved in water containing some acid, in a short time a diazo solution ready for use is obtained. Acid compounds such as bisulfate may also be added to the mixture.

Instead of the acid salts, neutral salts can be used, e. g. salts of di-isopropyl-naphthalene-sulfonic acid and so on.

*Example 11*

23.1 parts of alpha naphthylamine-N-sulfonic acid sodium salt, 25 parts of sodium sulfate and 36 parts of sodium bisulfate, all dehydrated as much as possible, are mixed well and a mixture of 7 parts of dry sodium nitrate and 20 parts of sodium sulfate is then added in portions.

When dissolved in cold water, a diazo solution ready for use is obtained after a short while. A small addition of mineral acid to the water accelerates the formation of the diazo compound, and the bisulfate may be left out or other acid mediums capable of liberating nitrous acid from sodium nitrite may be employed instead.

The sodium sulfate can be replaced either wholly or partly by other neutral salts, such as common salt, naphthalene sulfonic acid salts, more or less desiccated aluminium sulfate and so on.

In a similar way, developing preparations can be composed of the N-sulfonic acids of other amines which also may be nitrated or sulfonated.

Example 12

A mixture is prepared from 26.3 parts of 3.4-dichloro-benzene-1-sulfaminic acid sodium salt, 30 parts of naphthalene-tri-sulfonic acid sodium salt, 36 parts of sodium bisulfate and 7.2 parts of sodium nitrite. On dissolving in water the diazo solution is ready for use in a short time.

Example 13

52 parts of benzene are sulfonated with 156 parts of sulfuric acid-mono-hydrate at 90 degrees to 100 degrees centigrade. The product is cooled down and 138 parts of para-nitraniline are added. When the salt is formed, it is mixed with 272 parts of partly dehydrated aluminium sulfate (molecular weight about 500 instead of 667). The dry mixture is milled with 72 parts of dry sodium nitrite to a uniform mass.

Example 14

300 parts of 4-chloro-2-amino-1-toluene-benzene-sulfonate are mixed with 388 parts of practically anhydrous magnesium-potassium chlorid ($MgCl_2.2KCl$) 240 parts of sodium bisulfate and 72 parts of sodium nitrite.

Similar products are formed with the isomeric chloro-toluidines.

Example 15

175 parts of para-nitraniline-hydrochloride are mixed with 151 parts of partly desiccated aluminium sulfate, 120 parts of sodium bisulfate, 172 parts of para-toluene-sulfonic acid, and 72 parts of dry sodium nitrite.

Example 16

128 parts of ortho-chlor-aniline are stirred into 175 parts of sulfuric acid (70 per cent), 265 parts of partly desiccated aluminium sulfate (molecular weight about 500) are added to this mixture, and the resulting white and dry powder is ground with 72 parts of dry sodium nitrite.

Example 17

138 parts of para-nitraniline in a fine powder which may be made in a state capable of being readily wetted by an addition of 0.1 part of isopropyl-naphthalene-sulfonic acid sodium salt, are ground with 180 parts of desiccated magnesium-ammonium-chlorid (about $MgCl_2.2NH_4Cl$) 300 parts of anhydrous sodium bisulfate and 72 parts of dry sodium nitrite.

Instead of para-nitraniline, other free amines for example dianisidin, can be used.

We claim:

1. As a solid dry composition of matter, a mixture of a diazotizable aromatic amine in a dry solid form with about an equimolecular proportion of a nitrite and a water-soluble neutral salt in a dry condition.

2. As a solid dry composition of matter, a dry solid salt of a diazotizable aromatic amine mixed with a nitrite in about equimolecular proportions.

3. As a solid dry composition of matter, a dry solid salt of a diazotizable aromatic amine mixed with a nitrite in about equimolecular proportions and a water-soluble neutral salt in a dry condition.

4. As a solid dry composition of matter, a mixture of a dry acid salt of a diazotizable aromatic amine, a solid nitrite in about equimolecular proportion to the amine, a water-soluble neutral salt in a dry condition and a solid compound of an acid character.

5. A solid dry composition of matter for use as a developer comprising a dry solid salt of a diazotizable aromatic amine, a nitrite in about equivalent molecular proportion to the amine, a compound furthering the wetting of the mixture, a compound of an acid character and a neutral water-soluble salt in a dry condition.

In testimony whereof we have hereunto set our hands.

HANS KRZIKALLA.
KARL SCHNITZSPAHN.